(12) United States Patent
Liu et al.

(10) Patent No.: US 12,649,202 B2
(45) Date of Patent: Jun. 9, 2026

(54) AUTOMATIC WELDING APPARATUS USING INSIDE STEEL TUBE

(71) Applicants: CHINA RAILWAY URBAN CONSTRUCTION GROUP THE 1ST ENGINEERING CORPORATION LIMITED, Taiyuan (CN); CHINA RAILWAY URBAN CONSTRUCTION GROUP CORPORATION LIMITED, Changsha (CN)

(72) Inventors: Xiaoyong Liu, Taiyuan (CN); Qitao Lin, Taiyuan (CN); Meng Zhang, Taiyuan (CN); Jian Yang, Taiyuan (CN); Mingwen Hu, Changsha (CN); Qing Xia, Changsha (CN); Jianjun Yang, Taiyuan (CN); Yuanguang Qiu, Changsha (CN); Xuewen Wu, Changsha (CN); Xiaoben Yang, Taiyuan (CN); Jie Ling, Taiyuan (CN)

(73) Assignees: CHINA RAILWAY URBAN CONSTRUCTION GROUP THE 1ST ENGINEERING CORPORATION LIMITED, Taiyuan (CN); CHINA RAILWAY URBAN CONSTRUCTION GROUP CORPORATION LIMITED, Changsha (CN)

( * ) Notice: Subject to any disclaimer, the term of this patent is extended or adjusted under 35 U.S.C. 154(b) by 802 days.

(21) Appl. No.: 17/982,755

(22) Filed: Nov. 8, 2022

(65) Prior Publication Data

US 2023/0060134 A1 Mar. 2, 2023

(30) Foreign Application Priority Data

Jun. 8, 2022 (CN) ......................... 202210637421.X

(51) Int. Cl.
B23K 26/282 (2014.01)
(52) U.S. Cl.
CPC .................................. *B23K 26/282* (2015.10)
(58) Field of Classification Search
CPC ........................... B23K 26/21; B23K 37/0217;
B23K 37/0229; B23K 26/0869; B23K 26/282;
(Continued)

(56) References Cited

U.S. PATENT DOCUMENTS

| | | | | |
|---|---|---|---|---|
| 4,404,455 A | * | 9/1983 | Gotoh | ................... B23K 9/1274 228/9 |
| 4,649,250 A | * | 3/1987 | Kazlauskas | .......... B23K 9/0286 219/60 R |

(Continued)

*Primary Examiner* — Edward F Landrum
(74) *Attorney, Agent, or Firm* — Westbridge IP LLC

(57) ABSTRACT

Disclosed is an automatic welding apparatus used inside a steel tube, which includes a connecting seat and a fixing bracket. The fixing bracket is fixedly connected to a rear side of the connecting seat. a roller assembly is provided at one end of the fixing bracket, and a left side and a right side of the connecting seat are respectively fixedly connected with two first mounting brackets, between which a connecting shaft is rotatably connected. The connecting shaft is rotatably connected with a driving wheel, a signal transmission component is arranged on a periphery of the driving wheel, a laser welder is provided on an upper surface of the connecting seat, a laser welding head is provided at one end of the laser welder; and the laser welder is configured to start the laser welding head according to a signal transmitted by the signal transmission component.

6 Claims, 8 Drawing Sheets

(58) Field of Classification Search
CPC ............ B23K 37/0276; B23K 2103/04; B23K
26/044; B23K 26/067; B23K 26/04;
B23K 26/082; B23K 26/0608; B23K
26/0884; B23K 26/032; B23K 26/08;
B23K 2101/185; B23K 9/0286; Y02P
70/10
USPC .......... 219/60 A, 60 R, 161, 121.64, 121.63,
219/121.83, 121.79, 124.34, 125, 12, 11,
219/125.12; 228/8–12, 25–32, 47.1–55
See application file for complete search history.

(56) References Cited

U.S. PATENT DOCUMENTS

| | | | | |
|---|---|---|---|---|
| 5,796,069 A * | 8/1998 | Jones | .................... | B23K 26/106 |
| | | | | 219/121.64 |
| 5,925,268 A * | 7/1999 | Britnell | ................ | B23K 26/044 |
| | | | | 219/121.79 |
| 6,657,161 B2 * | 12/2003 | Marhofer | ............. | B23K 9/0282 |
| | | | | 219/60 R |
| 2020/0001409 A1 * | 1/2020 | Gagne | ........................ | B23P 6/00 |

* cited by examiner

307

AUTOMATIC WELDING APPARATUS USING INSIDE STEEL TUBE

CROSS-REFERENCE TO RELATED APPLICATIONS

The present application claims priority to Chinese Patent Application CN202210637421.X, filed on Jun. 8, 2022, the entire content of which is incorporated herein by reference.

TECHNICAL FIELD

The present disclosure relates to the technical field of welding equipment, and in particular to an automatic welding apparatus used inside a steel tube.

BACKGROUND

Since a concrete filled steel tube column has the advantages of high bearing capacity, superior seismic resistance and excellent fire resistance, it is widely used in buildings at present. The concrete filled steel tube column refers to a steel tube the interior of which is filled with concrete, where the concrete applies force to the steel tube, and the steel tube limits the concrete, so that the concrete inside the steel tube is subjected to compressive stress in three directions, thus delaying the occurrence and development of longitudinal micro-cracks of the concrete and improving the compressive strength and the compression deformation capacity of the concrete. In the conventional technology, a rebar cage is generally welded inside the steel tube to improve the bearing capacity and seismic resistance of the concrete filled steel tube column as much as possible.

The rebar cage generally includes multiple steel rings and multiple rebars, where the multiple steel rings are arranged in a column, centers of the multiple steel rings form a straight line L, the multiple rebars are arranged in parallel and inside the multiple steel rings, the multiple rebars are parallel to the straight line L and are uniformly arranged along a circumferential direction of the steel rings, and the intersections of each rebar and each steel ring are welded.

To weld the rebar cage in the steel tube, in the conventional technology, the steel tube is generally hoisted and fixed to a welding station by hoisting equipment, then the rebar cage is placed in the steel tube, and finally contact portions between the rebar cage and an inner wall of the steel tube are welded. At present, the above welding is generally performed manually by workers entering the steel tube. Although this method has certain practicability, the construction space inside the steel tube is small, and the welding of workers is limited by the space. Therefore, it is inconvenient for workers to operate, and it also affects the work efficiency.

SUMMARY

In view of the above problems existing in the conventional technology, the technical problem to be solved by some embodiments in the present disclosure is that manually welding the rebar cage in the steel tube in the conventional technology is inconvenient, and has low work efficiency.

In order to solve the above technical problems, the following technical solution is provided according to the present disclosure. An automatic welding apparatus used inside a steel tube includes a connecting seat and a fixing bracket, where the fixing bracket is fixedly connected to a rear side of the connecting seat; a roller assembly is provided at one end of the fixing bracket, a left side and a right side of the connecting seat are each fixedly connected with a first mounting bracket, a connecting shaft is rotatably connected between the two first mounting brackets, the connecting shaft is rotatably connected with a driving wheel, a signal transmission component is arranged on a periphery of the driving wheel, a laser welder is provided on an upper surface of the connecting seat, a laser welding head is provided at one end of the laser welder; and the laser welder is configured to start the laser welding head according to a signal transmitted by the signal transmission component.

In some embodiments, an output end of the motor is fixedly connected with a first belt pulley, the first belt pulley is in driving connection with a second belt pulley through a belt, and the second belt pulley is fixedly connected to a periphery of the connecting shaft.

In some embodiments, the roller assembly includes a connecting frame, two leading screw mounting blocks and a micro leading screw; a front side of the connecting frame is fixedly connected to the fixing bracket, a left side and a right side of the connecting frame are each provided with a vertical sliding groove, the front side and the rear side of the connecting frame are each provided with a vertical through groove, and the through groove is in communication with the sliding groove; an upper part and a lower part of the front side of the connecting frame are each fixedly connected with one leading screw mounting block, and the micro leading screw is rotatably connected between the two leading screw mounting blocks.

In some embodiments, a left end of each slider is located in the left sliding groove, and a right end of each slider is located in the right sliding groove.

In some embodiments, a top surface and a bottom surface of the connecting frame are each slidably connected with a moving rod, the two moving rods are coaxial and are arranged symmetrically about a center of the connecting frame in a top-bottom direction; a bottom end of the moving rod located at the top surface of the connecting frame is fixedly connected to the slider close to the top surface of the connecting frame, and a top end of the moving rod located at the bottom surface of the connecting frame is fixedly connected to the slider close to the bottom surface of the connecting frame.

In some embodiments, one end, away from the connecting frame, of each of the two moving rods is provided with a second mounting bracket, is directed through the corresponding second mounting bracket and is fixedly connected with a circular block; a third spring is sleeved on a portion, located in the corresponding second mounting bracket, of each of the two moving rods, one end of each third spring is fixedly connected to the corresponding circular block, the another end of each third spring is fixedly connected to an inner wall of the corresponding second mounting bracket, a connecting wheel is rotatably connected inside each of the two second mounting brackets through a connecting pin, and a distance between each connecting wheel and the center of the connecting frame is larger than a distance between the corresponding circular block located in the same second mounting bracket as the connecting wheel and the center of the connecting frame.

Compared with the conventional technology, the present disclosure at least has the following advantages.

(1) The automatic welding apparatus used inside a steel tube is placed inside the steel tube, the two connecting wheels in the roller assembly are controlled to abut against two rebars on the rebar cage respectively and be able to roll on the rebars, and the driving wheel and the lower connecting wheel are located on the same rebar. In this case, the motor is started to drive the first belt pulley to rotate, and in turn drive the second belt pulley to rotate through the belt, so that the connecting shaft rotates accordingly, and with the rotation of the connecting shaft, the driving wheel is driven to rotate. The rotation of the driving wheel enables the automatic welding apparatus used inside a steel tube to move on the rebar, so as to change the position of the automatic welding apparatus used inside a steel tube.

(2) The rotation of the driving wheel drives a positioning wheel to rotate, the positioning wheel is subjected to a pushing force when the positioning wheel is in contact with the rebar ring, to move a connecting rod upward through a mounting pin and in turn drive a signal trigger block fixed to the connecting rod to move upward. The signal trigger block on the connecting rod comes into contact with another signal trigger block fixed to the inner side of the top wall of a cylindrical sleeve, and then a welding signal is transmitted to a control board on the laser welder through a data line, so that the control board controls the welding head to start welding and to weld a connecting portion between the rebar ring and the rebar to the inner wall of the steel tube. The driving wheel continues to move after the welding is completed, and at this time the positioning wheel is no longer in contact with the rebar ring, a first spring recovers from the deformation and pushes the connecting rod to return, and the two signal trigger blocks are separated. The welding at the next position is performed when the positioning wheel is in contact with the next rebar ring, thereby realizing automatic welding, and reducing the situation of workers entering the tube. Therefore, the automatic apparatus according to the present disclosure welding is no longer limited by the space of the tube, and has higher efficiency compared with manual work.

DETAILED DESCRIPTION OF THE EMBODIMENTS

The present disclosure is described in further detail below.

Figure 1:
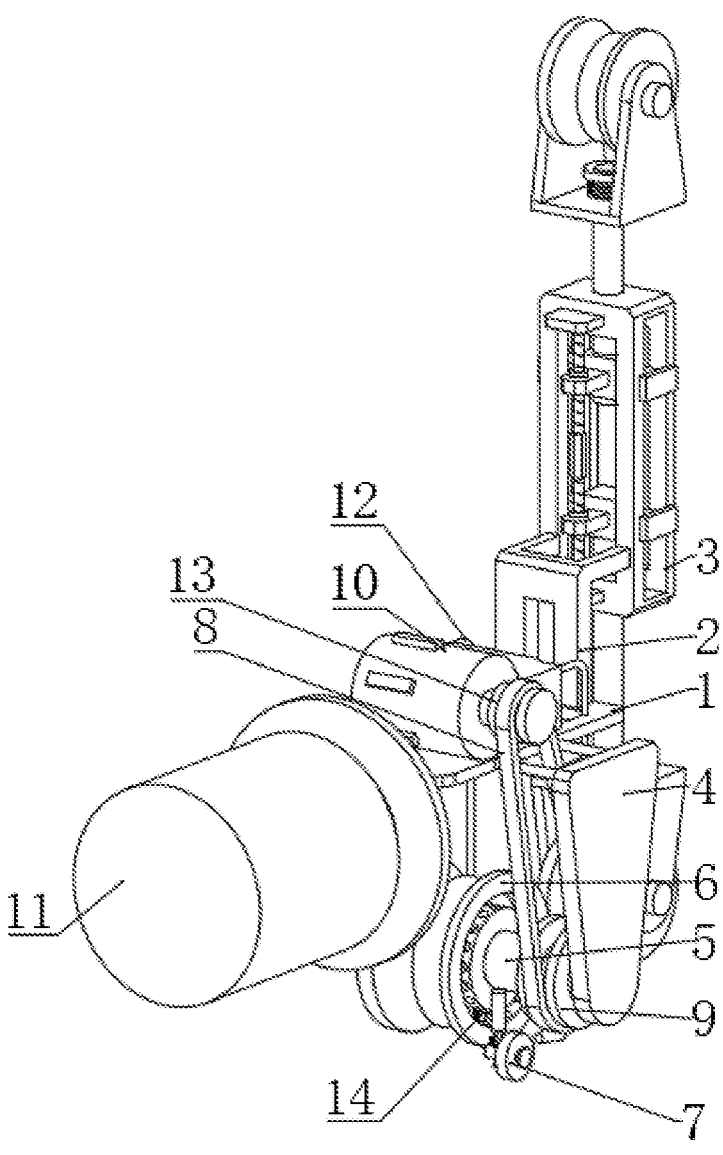
FIG. 1 is a schematic view showing an overall structure of the automatic welding apparatus used inside a steel tube according to the present disclosure.
Figure 2:
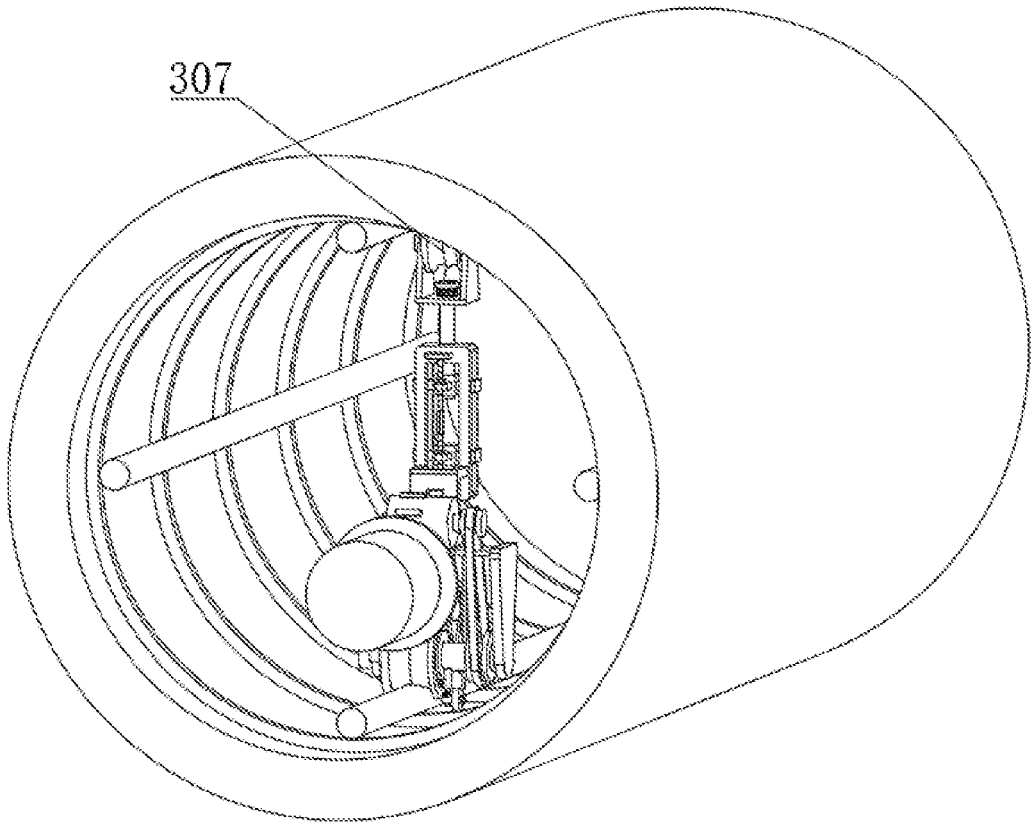
FIG. 2 is a schematic view showing that the automatic welding apparatus used inside a steel tube is running in a steel tube.
Figure 3:
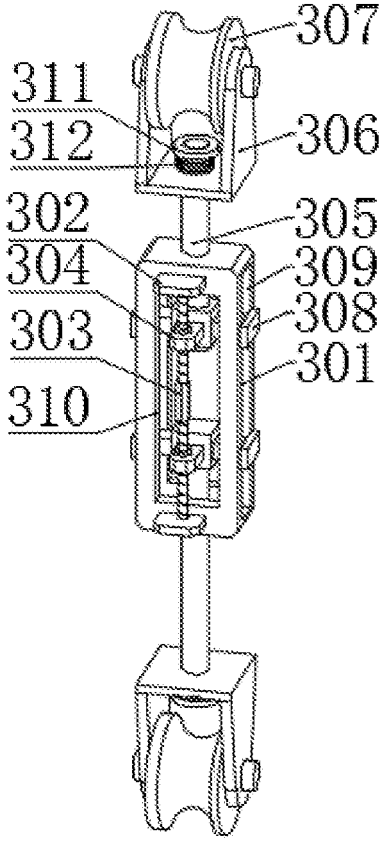
FIG. 3 is a schematic structural view of a roller assembly.
Figure 4:
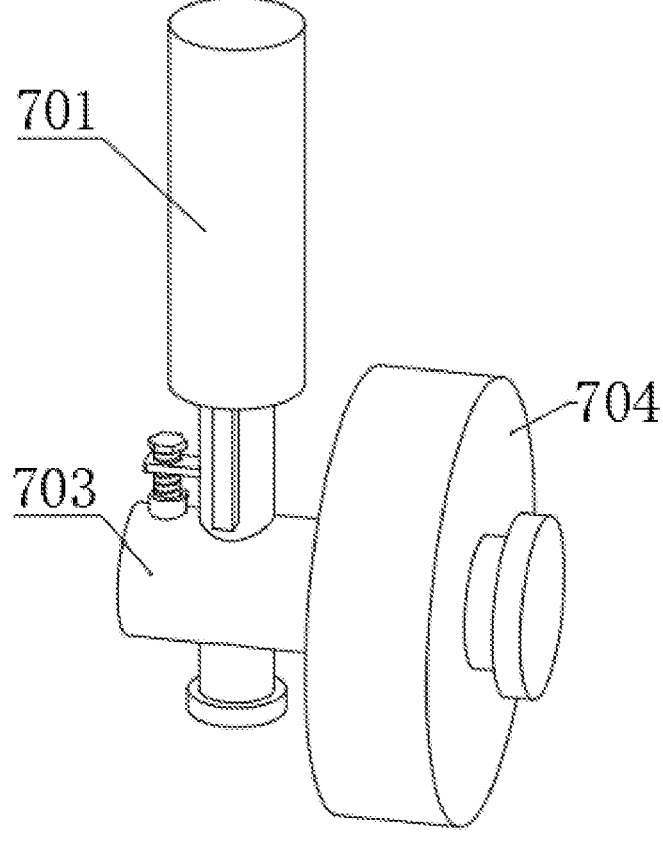
FIG. 4 is a schematic structural view of a signal transmission component.
Figure 5:
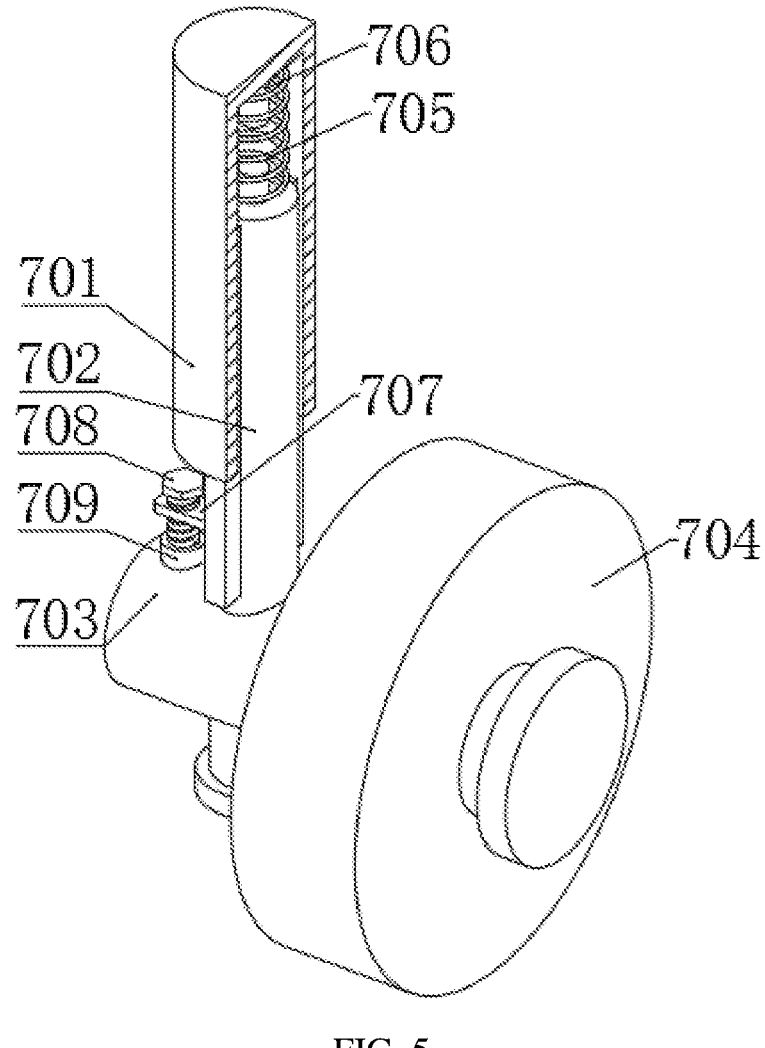
FIG. 5 is a schematic structural view showing a connection between a cylindrical sleeve and a connecting rod.
Figure 6:
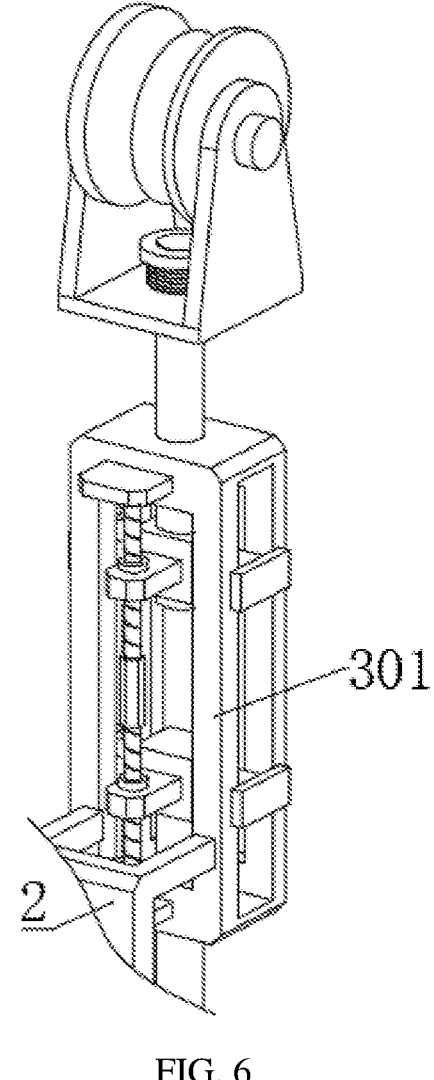
FIG. 6 is a schematic enlarged view showing a partial structure.
Figure 7:
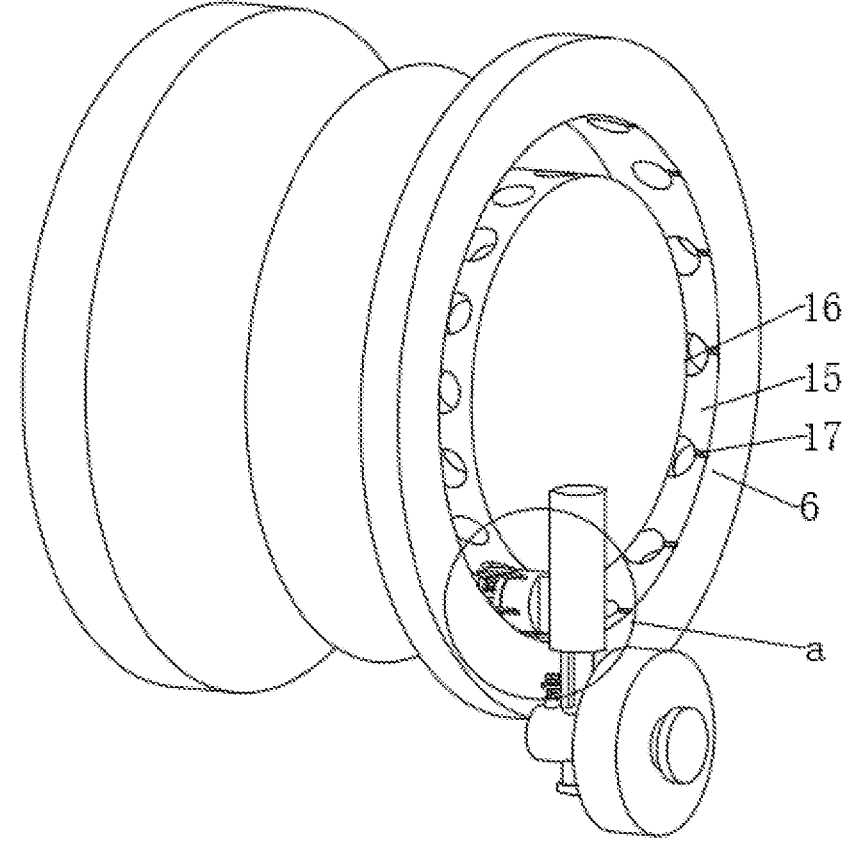
FIG. 7 is a schematic structural view showing a connection between a driving wheel and a snap-in block assembly.
Figure 8:
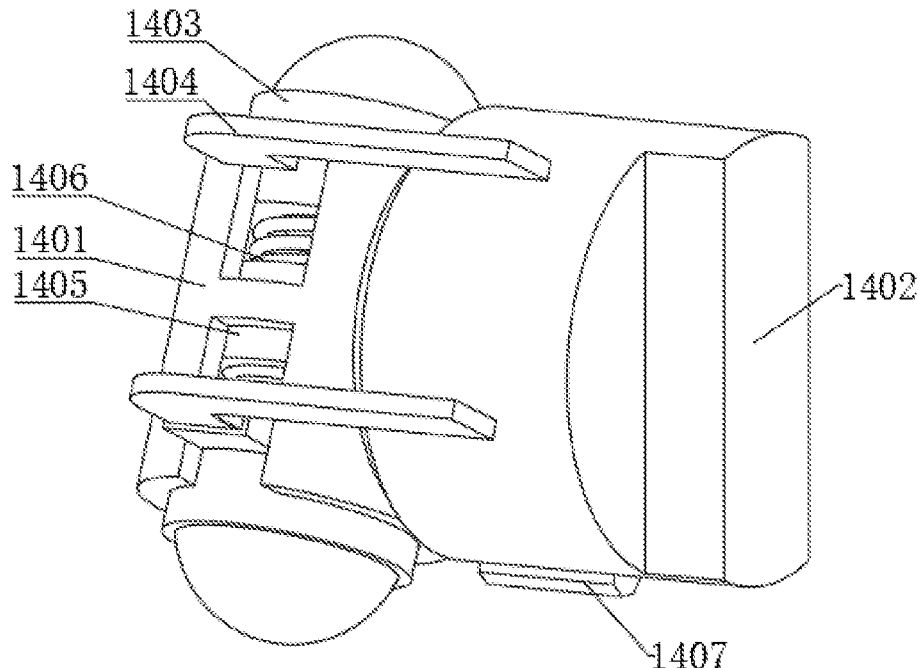
FIG. 8 is a schematic structural view of the snap-in block assembly.
Figure 9:
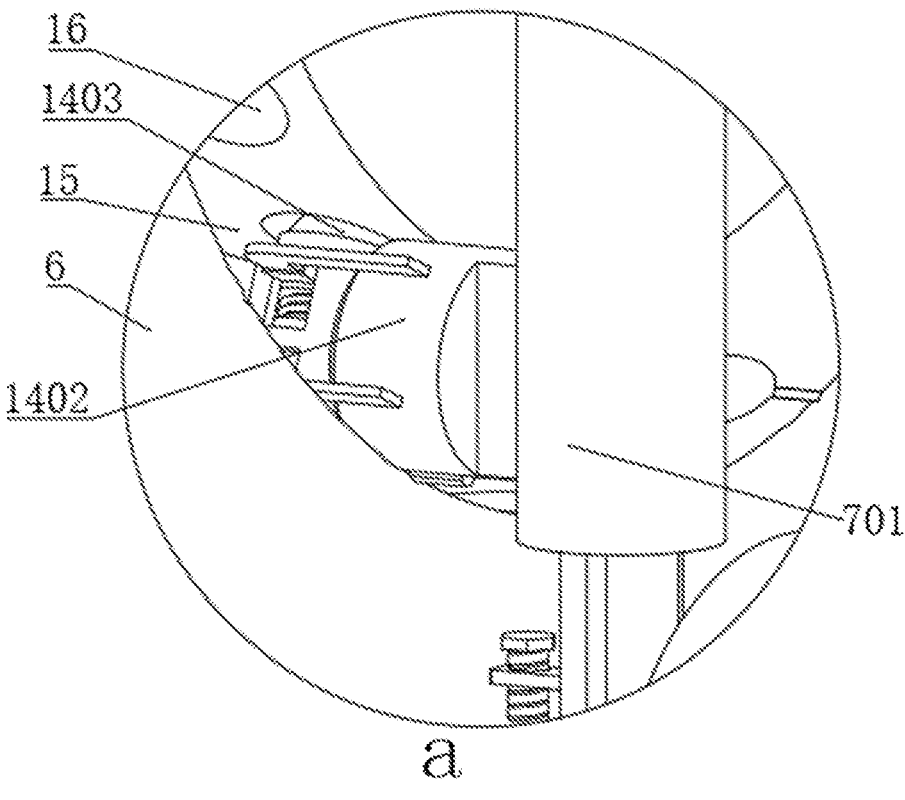
FIG. 9 is a schematic enlarged view of portion "a" in FIG. 7.

The up, down, left, right, front and rear in the present disclosure are all defined according to the orientation in FIG. 1, where the rear represents a direction into the paper, and the front represents a direction out of the paper.

FIGS. 1 to 9 show a first embodiment. An automatic welding apparatus used inside a steel tube includes a connecting seat 1 and a fixing bracket 2. The fixing bracket 2 is fixedly connected to a rear side of the connecting seat 1, and a roller assembly 3 is provided at one end of the fixing bracket 2. A left side and a right side of the connecting seat 1 are respectively fixedly connected with two first mounting brackets 4, between which a connecting shaft 5 is rotatably connected. The connecting shaft 5 is rotatably connected with a driving wheel 6, and a signal transmission component 7 is arranged on the periphery of the driving wheel 6. A laser welder 12 is provided on an upper surface of the connecting seat 1, a laser welding head is provided at one end of the laser welder 12, and the laser welder 12 is configured to start the laser welding head according to a signal transmitted by the signal transmission component 7.

The upper surface of the connecting seat 1 is fixedly connected with a motor 10, and one end of the connecting seat 1 is fixedly connected with a battery pack 11. Specifically, the battery pack 11 is fixedly connected to a front end of the connecting seat 1. An output end of the motor 10 is fixedly connected with a first belt pulley 13, which is in driving connection with a second belt pulley 9 through a belt 8, and the second belt pulley 9 is fixedly connected to a periphery of the connecting shaft 5.

The roller assembly 3 includes a connecting frame 301, two leading screw mounting blocks 302 and a micro leading screw 303. A front side of the connecting frame 301 is fixedly connected to the fixing bracket 2, a left side and a right side of the connecting frame 301 are each provided with a vertical sliding groove 309, a front side and a rear side of the connecting frame 301 are each provided with a vertical through groove 310, and the through grooves 310 are in communication with the sliding grooves 309. An upper part and a lower part of the front side of the connecting frame 301 are each fixedly connected with one leading screw mounting block 302, and the micro leading screw 303 is rotatably connected between the two leading screw mounting blocks 302.

An upper part of the micro leading screw 303 has an upper thread, a lower part of the micro leading screw 303 has a lower thread, and rotation directions of the upper thread and the lower thread are opposite. The upper part and the lower part of the micro leading screw 303 are each mounted with a leading screw sleeve 304, and a rear end of each leading screw sleeve 304 is fixedly connected with a slider 308.

A left end of each slider 308 is located in the left sliding groove 309, and a right end of each slider 308 is located in the right sliding groove 309.

A top surface and a bottom surface of the connecting frame 301 are each slidably connected with a moving rod 305. The two moving rods 305 are coaxial and are arranged symmetrically about the center of the connecting frame 301 in a top-bottom direction. A bottom end of the moving rod 305 located at the top surface of the connecting frame 301 is fixedly connected to the slider 308 close to the top surface of the connecting frame 301, and a top end of the moving rod 305 located at the bottom surface of the connecting frame 301 is fixedly connected to the slider 308 close to the bottom surface of the connecting frame 301.

One end, away from the connecting frame 301, of each of the two moving rods 305 is provided with a second mounting bracket 306, is directed through the corresponding second mounting bracket 306 and is fixedly connected with a circular block 311. A third spring 312 is sleeved on a portion, located in the corresponding second mounting bracket 306, of each of the two moving rods 305, one end of each third spring 312 is fixedly connected to the corresponding circular block 311, the other end of each third spring 312 is fixedly connected to an inner wall of the corresponding second mounting bracket 306. A connecting wheel 307 is rotatably connected inside each of the two second mounting brackets 306 through a connecting pin, and a distance between each connecting wheel 307 and the center of the connecting frame 301 is larger than a distance between the corresponding circular block 311 located in the same second mounting bracket 306 as the connecting wheel 307 and the center of the connecting frame 301.

Specifically, the fixing bracket 2 is in an inverted-L shape, an edge of a transverse portion of the fixing bracket 2 is fixedly connected to the front side of the connecting frame 301, and a through hole is defined in the transverse portion of the fixing bracket 2. One of the two leading screw mounting blocks 302 is located above the through hole, the other leading screw mounting block 302 is located below the through hole, and an axis of the micro leading screw 303 is located in the through hole.

Specifically, the driving wheel 6 and the two connecting wheels 307 are made of plastic material, the driving wheel 6 and the two connecting wheels 307 which are made of plastic material can increase the friction force between the wheels and the rebar.

Before use, the automatic welding apparatus used inside a steel tube is placed inside the steel tube, the two connecting wheels 307 on the roller assembly 3 are controlled to abut against two rebars on the rebar cage respectively and be able to roll on the rebars, and the driving wheel 6 and the lower connecting wheel 307 are located on the same rebar. In this case, the motor 10 is started to drive the first belt pulley 13 to rotate, and in turn drive the second belt pulley 9 to rotate through the belt 8, so that the connecting shaft 5 rotates accordingly, and with the rotation of the connecting shaft 5, the driving wheel 6 is driven to rotate. The rotation of the driving wheel 6 enables the automatic welding apparatus used inside a steel tube to move on the rebar, so as to change the position of the automatic welding apparatus used inside a steel tube.

In specific use, since the micro leading screw 303 is a bidirectional leading screw and the rotation directions of the upper thread and the lower thread of the micro leading screw 303 are opposite, and the micro leading screw 303 on the roller assembly 3 is rotated by screwing so that the two leading screw sleeves 304 move toward or away from each other. The movement of the two leading screw sleeves 304 drives the sliders 308 fixedly connected to the corresponding leading screw sleeves 304 to move accordingly, so that the moving rods 305 fixedly connected to the sliders 308 move accordingly, thereby realizing the movement of the two moving rods 305 toward or away from each other, and the two moving rods 305 move to push the corresponding connecting wheels 307 connected to the moving rods 305 to abut against the corresponding rebars.

During the movement of the connecting wheel 307 toward the rebar, the connecting wheel 307 transmits the received resistance to the corresponding moving rod 305 if the connecting wheel 307 encounters a small obstacle, and then the second mounting bracket 306 moves slightly on the moving rod 305, to deform the [first] third spring 312. The elastic force of the [first] third spring 312 against the deformation acts on the moving rod 305, so as to ensure that the connecting wheel 307 abuts against the rebar again under the reaction force of the third spring 312 after the connecting wheel 307 rolls over the small obstacle, and ensure the stability of the movement.

Specifically, the signal transmission component 7 includes a cylindrical sleeve 701 and a connecting rod 702, an upper portion of the connecting rod 702 is located in the cylindrical sleeve 701, and the upper portion of the connecting rod 702 is slidably connected to an interior of the cylindrical sleeve 701. The lower periphery of the connecting rod 702 is slidably connected with a mounting pin 703, and a right end of the mounting pin 703 is rotatably connected with a positioning wheel 704. An upper end of the connecting rod 702 is fixedly connected to a first spring 705, and an upper end of the first spring 705 is fixedly connected to a top wall of the cylindrical sleeve 701. In the vertical direction, a lowest end of the periphery of the positioning wheel 704 is lower than a lowest end of the periphery of the driving wheel 6.

The upper end of the connecting rod 702 and an inner side of the top wall of the cylindrical sleeve 701 are each fixedly connected with a signal trigger block 706, and the two signal trigger blocks 706 are both located in the first spring 705 and are coaxial. The periphery of the connecting rod 702 is fixedly connected with a screw rod mounting block 707 which is perpendicular to an axis of the connecting rod 702. A threaded hole is defined in the screw rod mounting block 707, a screw rod 708 is threadedly connected to the threaded hole, and a lower end of the screw rod 708 is directed through the threaded hole in the screw rod mounting block 707 and is threadedly connected to a screw rod sleeve 709 which is fixed to the mounting pin 703. The screw rod 708 is screwed to move the positioning wheel 704 through the screw rod sleeve 709 and the mounting pin 703, so that an initial position of the positioning wheel 704 can be set as required.

Specifically, an annular groove 15 is defined on one side of the driving wheel 6, and a snap-in block assembly 14 is provided in the annular groove 15. Multiple abutting holes 16 are defined on one of two opposite side surfaces of the annular groove 15. Multiple abutting holes 16 and multiple snapping grooves 17 are defined on the other one of the two opposite side surfaces of the annular groove 15. The multiple abutting holes 16 and the multiple snapping grooves 17 are arranged along a circumferential direction of the driving wheel 6. The abutting holes 16 are in one-to-one correspondence with the snapping grooves 17 on the same side surface, where an axis of each abutting hole 16 is perpendicular to an axis of the corresponding snapping groove 17, and one end, close to the respective abutting hole 16, of the corresponding snapping groove 17 is in communication with an edge of the respective abutting hole 16.

Specifically, the snap-in block assembly 14 includes a connecting cylinder 1401, an external connecting block 1402, an abutting rod 1403 and a connecting handle 1404. The periphery of the connecting cylinder 1401 is fixedly connected to the external connecting block 1402, and the periphery of the external connecting block 1402 is fixedly connected with a snap-in block 1407. The snap-in block 1407 is parallel to an axis of the external connecting block 1402, and the snap-in block 1407 is in sliding fit with the snapping groove 17. A tenon fixedly connected to the cylindrical sleeve 701 is provided at a right end of the external connecting block 1402.

An inner wall of the connecting cylinder 1401 is fixedly connected with a baffle supporting block 1405 which is perpendicular to an axis of the connecting cylinder 1401. An upper surface and a lower surface of the baffle supporting block 1405 are each fixedly connected with a second spring 1406. One end of each of the two second springs 1406 is fixedly connected to the corresponding abutting rod 1403.

The connecting cylinder 1401 is arranged in the annular groove 15, and two ends of the connecting cylinder 1401 abut against an inner wall of the annular groove 15, that is, an upper end of the connecting cylinder 1401 abuts against an upper side surface of the annular groove 15, and a lower end of the connecting cylinder 1401 abuts against a lower side surface of the annular groove 15. The periphery of the external connecting block 1402 abuts against the inner wall of the annular groove 15, and one end, away from the baffle supporting block 1405, of each of the two abutting rods 1403 abuts against an inner wall of the corresponding abutting hole 16.

In specific implementation, the snap-in block assembly 14 includes two connecting handles 1404. Two through grooves which are in communication with an interior of the connecting cylinder 1401 are defined in the connecting cylinder 1401, and one end of each connecting handle 1404 is directed through the corresponding through groove and is fixedly connected to the periphery of the corresponding abutting rod 1403.

Since a distance between any two adjacent rebar rings in the rebar cage is equal and constant, it is likely that there is an excessive deviation between the initial position of the signal transmission component 7 and the position of the rebar ring during the process of placing the automatic welding apparatus used inside a steel tube, and this deviation results in inaccurate welding position. Therefore, before use, the two abutting rods 1403 can be disengaged from the corresponding abutting holes 16 by pulling the connecting handles 1404, and the signal transmission component 7 can be moved inside the annular groove 15 by rotating the snap-in block assembly 14 so as to adjust the initial position of the signal transmission component 7, thereby ensuring that the signal transmission component 7 is in accurate contact with each subsequent rebar ring, and improving the welding accuracy.

The rotation of the driving wheel 6 drives the positioning wheel 704 to rotate, the positioning wheel 704 is subjected to a pushing force when the positioning wheel 704 is in contact with the rebar ring, to move the connecting rod 702 upward through the mounting pin 703 and in turn drive the signal trigger block 706 fixed to the connecting rod 702 to move upward. The signal trigger block 706 on the connecting rod 702 comes into contact with another signal trigger block 706 fixed to the inner side of the top wall of the cylindrical sleeve 701, and then a welding signal is transmitted to a control board on the laser welder 12 through a data line, so that the control board controls the welding head to start welding and to weld a connecting portion between the rebar ring and the rebar to the inner wall of the steel tube. The driving wheel 6 continues to move after the welding is completed, and at this time the positioning wheel 704 is no longer in contact with the rebar ring, the first spring 705 recovers from the deformation and pushes the connecting rod 702 to return, and the two signal trigger blocks 706 are separated.

The welding at the next position is performed when the positioning wheel 704 is in contact with the next rebar ring, thereby realizing automatic welding and reducing the situation of workers entering the tube. Therefore, the automatic welding apparatus according to the present disclosure is no longer limited by the space of the tube, and has higher efficiency compared with manual work.

The invention claimed is:

1. An automatic welding apparatus used inside a steel tube, comprising a connecting seat and a fixing bracket, wherein the fixing bracket is fixedly connected to a rear side of the connecting seat, a roller assembly is provided at one end of the fixing bracket, a left side and a right side of the connecting seat are each fixedly connected with a first mounting bracket, and a connecting shaft is rotatably connected between the two first mounting brackets, the connecting shaft is rotatably connected with a driving wheel, and a signal transmission component is arranged on a periphery of the driving wheel; a laser welder is provided on an upper surface of the connecting seat, and a laser welding head is provided at one end of the laser welder; and the laser welder is configured to start the laser welding head according to a signal transmitted by the signal transmission component;

wherein the upper surface of the connecting seat is fixedly connected with a motor, and one end of the connecting seat is fixedly connected with a battery pack;

wherein an output end of the motor is fixedly connected with a first belt pulley, the first belt pulley is in driving connection with a second belt pulley through a belt, and the second belt pulley is fixedly connected to a periphery of the connecting shaft;

wherein the signal transmission component comprises a cylindrical sleeve and a connecting rod, wherein an upper end of the connecting rod is located in the cylindrical sleeve, and the upper end of the connecting rod is slidably connected to an interior of the cylindrical sleeve, wherein a lower periphery of the connecting rod is slidably connected with a mounting pin, and a right end of the mounting pin is rotatably connected with a positioning wheel, wherein the upper end of the connecting rod is fixedly connected to a first spring, and an upper end of the first spring is fixedly connected to a top wall of the cylindrical sleeve; in a vertical direction, a lowest end of a periphery of the positioning wheel is lower than a lowest end of the periphery of the driving wheel;

wherein the upper end of the connecting rod and an inner side of the top wall of the cylindrical sleeve are each fixedly connected with a signal trigger block, wherein the two signal trigger blocks are both located in the first spring and are coaxial, wherein the periphery of the connecting rod is fixedly connected with a screw rod mounting block which is perpendicular to an axis of the connecting rod, wherein a threaded hole is defined in the screw rod mounting block, a screw rod is threadedly connected to the threaded hole, and a lower end of the screw rod is directed through the threaded hole in the screw rod mounting block and is threadedly connected to a screw rod sleeve which is fixed to the mounting pin; the screw rod is configured to be screwed to move the positioning wheel through the screw rod sleeve and the mounting pin;

wherein an annular groove is defined on one side of the driving wheel, and a snap-in block assembly is arranged in the annular groove, wherein a first plurality of abutting holes are defined on one of two opposite side surfaces of the annular groove, and a second plurality of abutting holes and a plurality of snapping grooves are defined on the other one of the two opposite side surfaces of the annular groove, wherein the first plurality of abutting holes, the second plurality of abutting holes and the plurality of snapping grooves are arranged along a circumferential direction of the driving wheel, wherein the second plurality of abutting holes are in one-to-one correspondence with the plurality of snapping grooves on the other side surface; an axis of each abutting hole is perpendicular to an axis of the corresponding snapping groove, and one end, close to the respective abutting hole, of the corresponding snapping groove is in communication with an edge of the respective abutting hole;

wherein the snap-in block assembly comprises a connecting cylinder, an external connecting block, two abutting rods and connecting handles, wherein a periphery of the connecting cylinder is fixedly connected to the external connecting block, and a periphery of the external connecting block is fixedly connected with a snap-in block; the snap-in block is parallel to an axis of the external connecting block, and the snap-in block is in sliding fit with the snapping groove, a tenon fixedly connected to the cylindrical sleeve is provided at a right end of the external connecting block;

wherein an inner wall of the connecting cylinder is fixedly connected with a baffle supporting block which is perpendicular to an axis of the connecting cylinder, an upper surface and a lower surface of the baffle supporting block are each fixedly connected with a second spring, wherein one end of each of the two second springs is fixedly connected to corresponding one of the two abutting rods;

wherein the connecting cylinder is arranged in the annular groove, and two ends of the connecting cylinder abut against an inner wall of the annular groove, the periphery of the external connecting block abuts against the inner wall of the annular groove, and one end, away from the baffle supporting block, of each of the two abutting rods abuts against an inner wall of a corresponding abutting hole.

2. The automatic welding apparatus according to claim 1, wherein the roller assembly comprises a connecting frame, two leading screw rod mounting blocks and a micro leading screw;

a front side of the connecting frame is fixedly connected to the fixing bracket, a left side and a right side of the connecting frame are each provided with a vertical sliding groove, a front side and a rear side of the connecting frame are each provided with a vertical through groove, and the through groove is in communication with the sliding groove; an upper part and a lower part of the front side of the connecting frame are each fixedly connected with one leading screw mounting block, and the micro leading screw is rotatably connected between the two leading screw mounting blocks.

3. The automatic welding apparatus according to claim 2, wherein an upper part and a lower part of the micro leading screw are each mounted with a leading screw sleeve, and a rear end of each leading screw sleeve is fixedly connected with a slider.

4. The automatic welding apparatus according to claim 3, wherein a left end of each slider is located in the left sliding groove, and a right end of each slider is located in the right sliding groove.

5. The automatic welding apparatus according to claim 2, wherein a top surface and a bottom surface of the connecting frame are each slidably connected with a moving rod, the two moving rods are coaxial and are arranged symmetrically about a center of the connecting frame in a top-bottom direction; a bottom end of the moving rod located at the top surface of the connecting frame is fixedly connected to the slider close to the top surface of the connecting frame, and a top end of the moving rod located at the bottom surface of the connecting frame is fixedly connected to the slider close to the bottom surface of the connecting frame.

6. The automatic welding apparatus according to claim 5, wherein one end, away from the connecting frame, of each of the two moving rods is provided with a second mounting bracket, is directed through the corresponding second mounting bracket and is fixedly connected with a circular block; a third spring is sleeved on a portion, located in the corresponding second mounting bracket, of each of the two moving rods, one end of the third spring is fixedly connected to the corresponding circular block, another end of the third spring is fixedly connected to an inner wall of the corresponding second mounting bracket, a connecting wheel is rotatably connected inside each second mounting bracket through a connecting pin, and a distance between each connecting wheel and the center of the connecting frame is larger than a distance between the corresponding circular block located in the same second mounting bracket as the respective connecting wheel and the center of the connecting frame.

* * * * *